United States Patent
Carroll et al.

(10) Patent No.: US 7,854,950 B2
(45) Date of Patent: Dec. 21, 2010

(54) PRESSURE TREATING FOOD TO REDUCE SPOILAGE

(75) Inventors: Tim Carroll, Palmerston North (NZ); Ping Chen, Guangzhou (CN); Michelle Harnett, Palmerston North (NZ); James Harnett, Palmerston North (NZ)

(73) Assignee: Fonterra Co-operative Group Limited, Auckland (NZ)

( * ) Notice: Subject to any disclaimer, the term of this patent is extended or adjusted under 35 U.S.C. 154(b) by 1308 days.

(21) Appl. No.: 10/530,536

(22) PCT Filed: Oct. 8, 2003

(86) PCT No.: PCT/NZ03/00224

§ 371 (c)(1),
(2), (4) Date: Jan. 23, 2006

(87) PCT Pub. No.: WO2004/032655

PCT Pub. Date: Apr. 22, 2004

(65) Prior Publication Data

US 2006/0153962 A1 Jul. 13, 2006

(30) Foreign Application Priority Data

Oct. 8, 2002 (NZ) ........................................ 521836

(51) Int. Cl.
*A23L 3/16* (2006.01)
(52) U.S. Cl. ....................... 426/521; 426/522
(58) Field of Classification Search ................... 426/61, 426/583, 590, 599, 521, 522
See application file for complete search history.

(56) References Cited

U.S. PATENT DOCUMENTS

| 3,645,745 | A | 2/1972 | Magnino |
| 6,117,460 | A | 9/2000 | Kortschack |
| 6,379,663 | B1 * | 4/2002 | Gill et al. ................. 424/93.45 |

FOREIGN PATENT DOCUMENTS

| GB | 2 367 997 | 4/2002 |
| GB | 2367997 A | 4/2002 |
| JP | 7-170955 | 7/1996 |
| WO | WO 02/078457 | 10/2002 |
| WO | WO 03/003845 | 1/2003 |

OTHER PUBLICATIONS

De Ancos B., Pilar Cano M., Gomez R. Characteristics of stirred low-fat yoghurt as affected by high pressure (2000) International Dairy Journal, 10 (1-2), pp. 105-111.*

(Continued)

*Primary Examiner*—Timothy M Speer
(74) *Attorney, Agent, or Firm*—Knobbe Martens Olson & Bear LLP (57) ABSTRACT

The present invention broadly describes a method of pressure treating foods containing cultures, wherein the pressure treatments are performed under such conditions such that cultures survive while the growth of spoilage microflora is reduced, delayed, prevented or eliminated. Foods treated according to the invention include cultural dairy foods (such as yoghurts), fruit and vegetable juices and other dairy foods (such as cheese).

37 Claims, 4 Drawing Sheets

Yoghurt treated at different pressures with an abundant viable culture, but exhibiting varying degrees of spoilage after 95 days, depending on treatment pressure.

OTHER PUBLICATIONS

Calik et al., "Effect of high pressure processing on *Vibrio parahaemolyticus* strains in pure cultures and Pacific oysters," *Journal of Food Science*, 2002, pp. 1506-1510, Vo. 67, No. 4.

Ulmer et al., "Effects of high pressure on survival and metabolic activity of *Lactobacillus plantarum* TMW 1.460," *Applied and Environmental Microbiology*, Sep. 2000, pp. 3966-3973, vol. 66, No. 9.

Abee et al., "Bacteriocins: modes of action and potentials in food preservation and control of food poisoning," *International Journal of Food Microbiology* 28, 169-185 (1995).

Brul, S., and Coote, P., "Preservative Agents in Foods Modes of Action and Microbial Resistance Mechanisms," *International Journal of Food Microbiology* 50 1-17 (1999).

Buchanan K. and Patterson M., "Food bugs feel pressure of new technology," *TCE* (Jan. 2002).

Calik et al., "Effect of High-Pressure Processing on *Vibrio parahaemolyticus* Strains in Pure Culture and Pacific Oysters," *Journal of Food Science* vol. 67, No. 4 (2002).

Caplice, E. and Fitzgerald, G.F., "Food fermentations: role of microorganisms in food production and preservation," *International Journal of Food Microbiology* 50 131-149 (1999).

Erkkilä, S., "Bioprotective and probiotic meat starter cultures for the fermentation of dry sausages," University of Helsinki (2001).

Everson et al., "Bacterial Started Cultures in Sausage Products," *J. Agr. Food Chem.*, vol. 18, No. 4, 570-71 (1970).

Gervilla et al., "High Pressure Inactivation of Microorganisms Inoculated into Ovine Milk of Different Fat Contents," *J Dairy Sci* 83:674-682 (2000).

Helander et al., "Potential of lactic acid bacteria and novel antimicrobials against Gram-negative bacteria," *Trends in Food Science & Technology* vol. 8 146-150 (May 1997).

Holzapfel et al., "Biological preservation of foods with reference to protective cultures, bacteriocins and food-grade enzymes," *International Journal of Food Microbiology* 24 343-362 (1995).

Holzapfel et al., "Overview of gut flora and probiotics," *International Journal of Food Microbiology* 41 85-101 (1998).

Kronkamp et al., "Microorganisms in Milk and Yoghurt: Selective Inactivation by High Hydrostatic Pressure," International Dairy Federation symposium 2-271 (Sep. 1995).

Lee, Y. and Salminen S., "The coming age of probiotics," *Trends in Food Science & Technology*, vol. 6, 241-245 (Jul. 1995).

O'Reilly et al., "Use of Hydrostatic Pressure for Inactivation of Microbial Contaminants in Cheese," *Applied and Environmental Microbiology*, 4890-4896 (Nov. 2000).

Reps et al., "Effect of high pressures on *Streptococcus salivarius* subsp. *thermophilus*," *Milchwissenschaft* 56(3) (2001).

Rodgers et al., "Bacteriocin production by protective cultures," *Food Service Technology* 2, 59-68 (2002).

Smelt, J.P.P.M., "Recent advances in the microbiology of high pressure processing," *Trends in Food Science & Technology*, 9, 152-158 (1998).

Tanaka, T. and Hatanaka, K. "Application of Hydrostatic Pressure to Yoghurt to Prevent its After-Acidification" *Nippon Shokuhin Kogyo Gakkaishi*, vol. 39, No. 2, 173-177 (1992).

Ulmer et al., "Effects of High Pressure on Survival and Metabolic Activity of *Lactobacillus plantarum* TMW 1.460," *Applied and Environmental Microbiology* 3966-3973 (Sep. 2000).

Yousef et al., "Behavior of *Listeria monocytogenes* in Wiener Exudates in the Presence of *Pediococcus acidilactici* H or Pediocin AcH," *Applied and Environmental Microbiology* 1461-1467 (May 1991).

Hua, Yu, "Controlling of the Quality and Proserving of the Yoghurt", *Acat Scientiarum Naturalium Universitatis Chengduensis*, vol. 16 No. 2 (Jun. 1997).

"High Pressure Processing on Food and its Application", No. 453003, *Food Science and Technology* No. 6 (2000).

China Milk Cow, 1:47-49 (2001).

\* cited by examiner

Figure 1a Figure 1b

Effect of pressure treatment on survival of Penicillium mould (solid symbols) and Rhodia MY900 yoghurt starter (open symbols).

Figure 2

Yoghurt treated at different pressures with an abundant viable culture, but exhibiting varying degrees of spoilage after 95 days, depending on treatment pressure.

Figure 3

Effect of 1 second of pressure treatment at 430MPa on viable culture and spoilage levels after 15 days.

Figure 4

Effect of pH on pressure treatment

US 7,854,950 B2

PRESSURE TREATING FOOD TO REDUCE SPOILAGE

REFERENCE TO RELATED APPLICATIONS

The present application is the U.S. National Phase of PCT application number PCT/NZ2003/000224, filed Oct. 8, 2003, which claims priority to New Zealand application number 521836, filed Oct. 8, 2002.

FIELD OF INVENTION

The present invention relates to methods of pressure treating food so as to reduce spoilage of the food. More particularly the invention relates to the use of high pressure treatment to reduce microbial spoilage in foods and/or to render the food safe for consumption, while retaining viable desired cultures.

BACKGROUND

Many foods have relatively short shelf lives due to the presence of undesired contaminants such as yeasts and moulds. Such yeasts and moulds cause undesired spoilage, and often render the foods inedible.

It is known to inactivate undesirable microorganisms in food by a variety of methods, the most common of which is heating. Heat treatment can significantly improve both the safety and the keeping quality of the food. In particular the shelf life of the food can be extended.

However, properties such as the taste, texture, and nutritional quality of some foods can be compromised by a heat treatment. For example, heat-treated meat can have unacceptable cooked flavour. A heat-treated cultured milk product such as yoghurt does not contain a live bacterial culture, as the culture is inactivated by the treatment.

It was recognised at the beginning of the last century, that bacteria used for the fermentation of products such as yoghurt, are of benefit to human health if consumed alive. It is now recognised that certain cultures of live micro-organisms, defined as probiotic, exert health benefits beyond basic nutrition upon ingestion in certain numbers. (Holzapfel et al). It is known to add these probiotic bacteria to foods (Lee and Salaminen) for delivery by ingestion. However, it is difficult to deliver such bacteria in sufficient numbers in a food that is subsequently heat-treated.

It is an object of the present invention to provide an improved or alternative method of treating a food product, and/or to go at least some way to overcoming the problems encountered with the prior art.

SUMMARY OF INVENTION

In one aspect the invention broadly comprises of a method of treating a food comprising the following steps:
selecting a food comprising at least one strain of a culture, said strain capable of surviving a pressure treatment at a predetermined pressure and pH, and
subjecting the food to a treatment pressure at or below the predetermined pressure, wherein the treatment pressure reduces, delays, prevents or eliminates growth of spoilage microflora.

Useful treatment pressures according to the invention may be selected from 350 MPa, 360 MPa, 370 MPa, 380 MPa, 390 MPa, 400 MPa, 410 MPa, 420 MPa, 430 MPa, 440 MPa 450 MPa, 460 MPa, 470 MPa, 480 MPa, 490 MPa, 500 MPa, 510 MPa, 520 MPa, 530 MPa, 540 MPa, 550 MPa, 560 MPa, 570 MPa, 580 MPa, 590 MPa, 600 MPa, 610 MPa, 620 MPa, 630 MPa, 640 MPa and 650 MPa.

Preferably the food is subjected to a pressure of at least 350 MPa.

More preferably the food is subjected to a pressure of at least 400 MPa.

It is envisaged that the invention may be performed at a pH level selected from the following: 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8; 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9 and 8.0.

In the preferred embodiment, the food is at a pH of between 3.0 and 8.0 when subjected to the treatment pressure.

Preferably the pH is between 3.6 and 4.8.

Most preferably the pH is between 4.0 and 4.6.

Preferred temperatures at which the invention may be performed can be selected from (in degrees Celsius): 0, 4, 5, 10, 15, 20, 25, 30, 35 and 40.

Preferably the food is pressure treated at a temperature in the range 0 degrees Celsius to 40 degrees Celsius.

Most preferably the food is pressure treated at a temperature in the range 0 degrees Celsius to 20 degrees Celsius.

In a preferred embodiment, the food is pressure treated after packaging.

A preferred food according to this aspect of the invention is a cultured dairy product.

A preferred cultured dairy product used in the invention is yoghurt.

Alternative cultured dairy products used in the invention may be selected from yoghurt drinks, dairy desserts, cottage cheese, cream cheese and cultured beverages.

Preferred strains of culture used in this aspect of the invention are selected from: *Lactobacillus acidophilus* HN017 AGAL deposit number NM97/09515 dated 18 Aug. 1997, *Bifidobacterium lactis* HN019 AGAL deposit number NM97/09513 dated 18 August 1997, *Streptococcus thermophilus* St10, *Streptococcus thermophilus* St49, *Lactobacillus helveticus* Lh1, *Lactobacillus helveticus* Lh5001, *Lactobacillus delbrukeii* subsp *bulgahcus* Lb1, Rhodia MY900 (commercially sold by Rhodia under the trade mark "MY900"), Rhodia MY105, Rhodia MYE95, Rhodia MYBio6, Rhodia TA060, Rhodia LH100, Chr. Hansen ABT4, Chr. Hansen YC-X11, Chr. Hansen ABT3, Danisco VI, Danisco Yo Mix VW, Danisco MSK Mix ABNA45, *Bifidobacterium lactis* Bb12 (commercially sold by Nestle under the trade mark "Bb12"), *Bifidobacterium lactis* Wisby 420 (commercially sold by Wisby under the trade mark "420") and combinations thereof. The strains identified as St10, St49, Lh1, Lh5001 and Lb1 are commercially available from the Fonterra Research Centre Limited, Palmerston North, New Zealand.

In a second aspect, the invention broadly comprises of a method of treating a food, comprising the steps:
selecting a food containing at least one strain of a culture, said strain being a probiotic strain capable of surviving a pressure treatment at a predetermined pressure and pH, and
subjecting the food to a treatment pressure at or below the predetermined pressure, wherein the treatment pressure reduces, delays, prevents or eliminates growth of spoilage microflora.

It is envisaged that the probiotic may be either used to ferment the food, or may be added to the food directly.

Probiotic strains used in the invention may be selected from strains of *Bifidobacterium*, preferably *Bifidobacterium lactis*.

Preferred probiotic strains used in the invention are selected from Bifidobacterium lactis HN019 AGAL deposit number NM 97/09513 dated 18 Aug. 1997, and *Bifidobacterium* sold under the trade names Bb12 (Nestle) and Wisby 420.

Other preferred probiotic strains used in the invention are selected from strains of *Lactobacillus*, preferably *Lactobacillus acidophilus*.

Most preferably a probiotic strain used in the invention is *Lactobacillus acidophilus* HN017 AGAL deposit number NM 97/09515 dated 18 Aug. 1997.

Useful treatment pressures according to the invention may be selected from 350 MPa, 360 MPa, 370 MPa, 380 MPa, 390 MPa, 400 MPa, 410 MPa, 420 MPa, 430 MPa, 440 MPa 450 MPa, 460 MPa, 470 MPa, 480 MPa, 490 MPa, 50 MPa, 510 MPa, 520 MPa, 530 MPa, 540 MPa, 550 MPa, 560 MPa, 570 MPa, 580 MPa, 590 MPa, 600 MPa, 610 MPa, 620 MPa, 630 MPa, 640 MPa and 650 MPa.

More preferably the pressure is at least 350 MPa.

Even more preferably the pressure is at least 400 MPa.

Alternatively the pressure is at least 500 MPa.

It is envisaged that the invention may be performed at a pH level selected from the following: 3.0, 3.1, 3.2, 3.3, 3.4, 3.5, 3.6, 3.7, 3.8, 3.9, 4.0, 4.1, 4.2, 4.3, 4.4, 4.5 and 4.6.

In the preferred embodiment, the food is at a pH of between 3.0 and 4.6 when subjected to the treatment pressure.

Preferred conditions of temperature are as noted for the first aspect of the invention.

In a third aspect the invention broadly comprises of a method of treating a food comprising the following steps:

selecting a food containing at least one strain of a protective culture, said strain capable of surviving a pressure treatment at a predetermined pressure and pH, and subjecting the food to a treatment pressure at or below the predetermined pressure, wherein the treatment pressure reduces, delays, prevents or eliminates growth of spoilage microflora.

Preferably the protective culture is selected from those used in cultured dairy foods, fermented foods, cooked meats, vegetables, salads, cook-chilled foods, ready-to-eat foods. Such protective cultures include, but are not limited to, probiotics, bacteriocins and acid producing bacteria.

Preferred conditions of pH and temperature are as noted for the first aspect of the invention.

In a fourth aspect the invention consists in the use of at least one bacterial strain in a food to be subjected to a pressure treatment at a predetermined pressure such that undesired microflora are inactivated while the bacterial strain survives, said bacterial stain being selected from: *Lactobacillus acidophilus, Bifidobacterium lactis, Lactobacillus acidophilus* HN017 AGAL deposit number NM97/09515 dated 18 Aug. 1997, *Bifidobacterium lactis* HN019 AGAL deposit number NM97/09513 dated 18 Aug. 1997, *Streptococcus thermophilus* St10, *Streptococcus thermophilus* St49, *Lactobacillus helveticus* Lh1, *Lactobacillus helveticus* Lh5001, *Lactobacillus delbruekeii* subsp *bulgaricus* Lb1, Rhodia MY900, Rhodia MY105, Rhodia MYE95, Rhodia MYBio6, Rhodia TA060, Rhodia LH100, Chr. Hansen ABT4, Chr. Hansen YC-Xl 1, Chr. Hansen ABT3, Danisco V1, Danisco Yo Mix VW, Danisco MSK Mix ABN145, and *Bifidobacterium* sold under the trade names Bb12 (Nestle) and Wisby 420 (Wisby).

According to the aspects of the invention, the foods may be subjected to the treatment pressure for between about 1 second and about 10 minutes. Preferred times may be selected from 1 second, 5 seconds, 10 seconds, 20 seconds, 30 seconds, 60 seconds, 90 seconds, 2 minutes, 3 minutes, 4 minutes, 5 minutes, 6 minutes, 7 minutes, 8 minutes, 9 minutes or 10 minutes.

The invention also consists in a food treated by the methods described herein.

The invention may also broadly be said to consist in any alternative combination of features as described or shown in the accompanying examples. Known equivalents of these features not expressly set out are nevertheless deemed to be included

DETAILED DESCRIPTION

As mentioned herein, references to "pressure treatment" or "UHP treatment" mean ultra high-pressure treatments. Such treatments are generally accepted as pressure treatments using pressures of at least 100 MPa. This is also known in the art as "high pressure", "high hydrostatic pressure" PEP) or "high pressure processing" (HPP).

A pressure treatment is understood to comprise the following steps:

placing a food into the chamber and sealing the chamber, raising the pressure in the chamber, and thereby the food to a predetermined set pressure, holding the food at this pressure for a predetermined time (termed the treatment time, dwell time or hold time), and releasing the pressure from the chamber and removing the food.

The characteristics of the high-pressure equipment used might affect the conditions required to successfully perform the invention. In particular, the time taken to achieve the treatment pressure and to release the treatment pressure from the food, and the accuracy with which the treatment pressure is delivered and controlled may influence the outcomes, particularly in situations where it is not necessary for the food to be held at the treatment pressure for an appreciable time.

The nature of the pressure treatment process results in temperature fluctuations in the treated food during treatment As such, references to preferred temperatures during pressure treatments refer to the temperature of the food or beverage before the pressure is raised.

As mentioned herein, references to "food" or "foodstuffs" include, for example yoghurts, yoghurt drink, Kefir, cheeses, milk, dairy products, dairy desserts, fruit juices, beverages, sport drinks, and the like.

As mentioned herein, references to "spoilage microflora" refer to contaminants such as yeasts and moulds, food-poisoning bacteria, pathogens, naturally present bacteria, and starter organisms that have completed their function. References to "spoilage" refer to the presence of such organisms in food or foodstuffs, and the effect that this presence has on the various properties of the food (e.g. shelf life, taste or texture).

References are made to the reduction, delay, prevention and elimination of spoilage microflora. Such references encompass situations where existing spoilage microflora are inactivated, in particular where such inactivation is required to meet food safety labeling or regulatory requirements.

As mentioned herein, references to "protective culture" refer to a live culture that produces a metabolite that exhibits antimicrobial activity.

As mentioned herein, references to "probiotics" refer to strains of bacteria with health promoting and immune-enhancing properties. Such strains have an ability to survive in and colonise the intestine and gut, and are well known in the art.

As mentioned herein, references to "surviving" a pressure treatment refer to the survival of strains in useful numbers. For example, in yoghurts, "surviving" a pressure treatment means that the number of intact viable starter organisms after the pressure treatment are such that they satisfy standards of identity, product definition and regulation (typically one hundred thousand colony forming units per gram or higher). With reference to probiotics, "surviving" may refer to the number of intact probiotic organisms required for a dosage when ingested with a quantity of food (typically one hundred thousand colony forming units per gram or higher).

A desirable feature of UHP treatment is its non-invasive nature. With appropriate equipment, foodstuffs and the like can be treated in the same containers that they are to be distributed to the consumer in. For example, set or stirred yoghurt can be treated in pottles and cultured dairy drinks can be treated in their bottles. Pressure treatment may also be applied to non-homogeneous foods such as yoghurts containing fruit, nuts or fruit purees.

It is also envisaged that foods can be treated in accordance with the invention when they have already contain appreciable numbers of spoilage microflora, and are considered "borderline" by consumer and/or regulatory requirements.

For situations where the desired microorganisms (for example, yoghurt cultures and/or probiotics) and the undesired microorganisms such as contaminants are in the same sealed container, a method of selective inactivation has been identified.

It has now been identified that it is possible to subject a food to a UHP treatment that inactivates spoilage microflora or other unwanted microorganisms, but in which desirable bacteria survive the treatment in useful numbers. These desirable bacteria could be typical yoghurt or probiotic cultures that offer a health benefit if consumed alive or live protective cultures that can inhibit contaminating microorganisms.

The invention offers the ability to preserve the quality of foods containing a live culture that is of significant commercial value. In particular we have found that we can produce cultured dairy products (such as yoghurt that contains abundant live cultures) having an extended shelf life due to reduced spoilage by spoilage microflora, such as yeasts and moulds.

The invention may also be used to produce a range of food products containing an abundant live probiotic culture, with an improved keeping quality due to reduced microbial contamination or spoilage.

Also identified is a method of treating foods containing a live protective culture that is capable of inactivating spoilage microflora. This process can be used to improve the safety and keeping quality of certain foods.

One method of identifying appropriate cultures for use in the present invention is to inoculate strains into a food and then treat the food at a pressure suitable for controlling the undesired microorganism, for example 350 MPa for 5 minutes or 450 MPa for 1 minute or 460 MPa for 1 second or 600 MPa for 1 second. Strains that survive the test-pressure treatment in useful numbers are identified as strains that may be useful according to the present invention.

In the case of yogurts, "useful numbers" can mean the number of viable starter (or specified microorganisms) specified by standards of identity, product definitions or regulation, (typically one hundred thousand colony forming units per gram or higher). In the case of foods containing viable probiotic bacteria, useful numbers can mean the number of viable bacteria required such that a sufficient dose is ingested with a specified quantity of the food (typically one hundred thousand colony forming units per gram or higher).

Once the suitably tolerant strains of culture have been identified, a food product can be manufactured containing that strain of culture. Alternatively, food products known to contain pressure tolerant bacteria could be identified. The food products can then be subjected to pressure treatment under conditions which are known to inactivate spoilage microflora, but allow survival of the selected strains of culture.

Figure 1A:
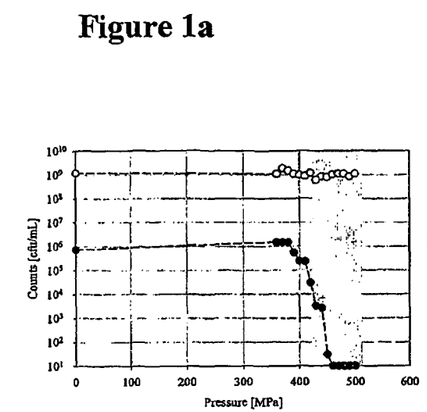
FIGS. 1*a* and 1*b* are graphs showing the effect of varying pressure treatments on *Penicillium* mould and yoghurt starter (MY900—sold by Rhodia).
Figure 1B:
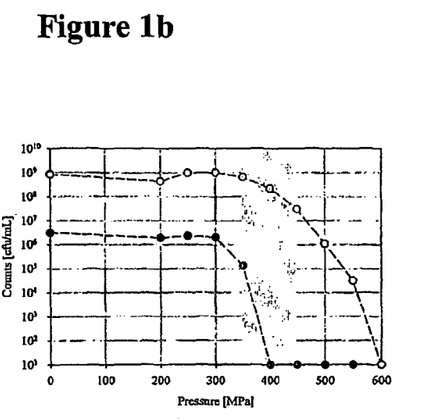

The method of selective inactivation can be understood with reference to FIGS. 1a and 1b which compares the levels of desired bacteria (commercial starter Rhodia MY900) and spoilage microflora (an intentionally added *Penicillium* mould) in a yoghurt at pH 4.4. In FIG. 1a, the yoghurt is subjected to various treatment pressures for a time of one second. After pressure treatment at about 460 MPa, the number of viable starter bacteria is one hundred million colony-forming units per gram or higher, but the mould is inactivated to levels below detection limits. After a pressure treatment of about 430 MPa, the number of viable starter bacteria is one hundred million colony-forming units per gram or higher, but the mould is reduced by at least 2.4 log cycles in number (this may be sufficient to prevent spoilage in a yogurt with a pre-treatment quality specification of less than one hundred colony-forming units of mould per gram). After a pressure treatment of less than 410 MPa, there is increased presence of mould. In FIG. 1b, the yoghurt is subjected to various treatment pressures for a time of five minutes. After a pressure treatment of about 400 MPa, the number of viable starter bacteria is one hundred million colony-forming units per gram or higher. After a pressure treatment of about 350 MPa the mould numbers are reduced by at least one log cycle, and at a pressure of about 400 MPa, the mould numbers are reduced to levels below detection limits. However at a pressure of 450 MPa or higher, although the mould numbers are reduced to levels below the limits of detection, the number of viable starter bacteria declines appreciably from about one million per gram at 500 MPa to only about 10 per gram at 600 MPa. Pressure treatment conditions may be selected based on considerations such as the level of protection against mould spoilage required, and the level of contamination before treatment as well as the number of viable desirable bacteria required.)

FIGS. 1a and 1b show the how varying pressure treatments can be used to inactivate an undesired microorganism (in this instance *Penicillium* mould shown on the graph as solid symbols) while retaining a desired microorganism in useful numbers (Rhodia MY900 yoghurt starter—open symbols). The grey highlighted portions illustrate a treatment window within which the competing requirements of desirable microorganism viability and undesired contaminant inactivation may be satisfied.

Some cultures can produce anti-microbial metabolites (such as bacteriocins), that impart specific protection against certain microorganisms (Holzapfel et al, Caplice & Fitzgerald). Such protective cultures may be added directly to the food as a viable starter organism or starter adjunct organism to improve microbial safety of the food and particularly protect against temperature abuse on distribution and storage. An alternative way to use such cultures is to first ferment an appropriate substrate to produce the desired metabolites and then inactivate the culture for sale and subsequent incorporation into the food.

Probiotic bacteria can be considered as an example of a protective culture by virtue of their influence on resident intestinal flora (Holzapfel et al Lee & Salamin).

Protective cultures can be used in cultured dairy foods, fermented foods, cooked meats, vegetables, salads, cook-chill foods and ready-to-eat meals.

Using the methods taught in the present invention, it is now possible to extend the shelf life and/or reduced spoilage levels of some foods by inactivating spoilage microflora such as spoilage organisms whilst retaining the viable protective cultures in the food to protect against growth of other undesired microflora, such as bacteria or bacteria spores.

The invention consists in the foregoing and also envisages constructions of which the following gives examples.

EXAMPLES

In some of the following examples, typical contaminants were deliberately added to the food products. The food products were then treated according to the methods of the invention.

The methods used to enumerate the bacteria in the following examples are summarised in Table 5 ("cfu"=colony forming units). AU cultures were obtained from the Fonterra Research Centre Culture Collection ("FRCCC") in Palmerston North, New Zealand, unless otherwise stated. The contaminant cultures used in the examples and their respective origins are summarised in Table 6.

The pressure treatments were done on Stansted Fluid Power FoodLab laboratory (30 mL) and pilot (675 mL) vessels (except for Examples 10 and 11, done on a Flow Autoclave Systems 2 L unit).

In examples where a treatment temperature is given, this was the temperature of the chamber contents before the pressure was raised.

Example 1

A Cultured Dairy Product Containing a Viable Culture

A 10% reconstituted skim milk (RSM) substrate was inoculated with 1% of a culture of *Streptococcus thermophilus* St-10 (FRCCC) and fermented overnight at 37° C. The pH of the cultured skim milk was adjusted to 4.4 by addition of lactic acid, and intentionally contaminated by spiking at $1.8 \times 10^6$ cfu/g (Table 5) with a *Yarrowia lipolytica* yeast (Table 6). The contaminated cultured milk so produced was then treated by applying a pressure of 400 MPa for 5 minutes at 10° C. This process produced a product with no detectable contaminating yeast (>5-log inactivation), while retaining a starter culture count of $3.3 \times 10^7$ cfu/g (M17 agar, Table 5).

Example 2

A Cultured Dairy Product Containing a Viable Culture

A 10% RSM substrate was inoculated with 1% of a culture of *Lactobacillus helveticus* Lh-5001 (FRCCC) and fermented overnight at 37-C. The pH of the cultured skim milk was adjusted to 4.4 and intentionally contaminated by spiking to $3.1 \times 10^6$ cfu/g (Table 5) with a *Penicillium* mould (Table 6). The contaminated cultured milk so produced was then treated by applying a pressure of 400 MPa for 5 minutes at 10° C. This process produced a product with no detectable contaminating mould, while retaining a starter culture count of $1.3 \times 10^8$ cfu/g (MRS agar, Table 5).

Example 3

A Cultured Dairy Product Containing a Viable Culture

A 10% RSM substrate was inoculated with 1% of a culture of *Lb. delbruekii* sub-species *bulgaficus* Lb-1 (FRCCC) and fermented overnight at 37° C. The pH of the cultured skim milk was adjusted to 4.4, and intentionally contaminated by spiking at $9.3 \times 10^7$ cfu/g (Table 5) with a *Debromyces hanseii* yeast (Table 6). The contaminated cultured milk so produced was then treated by applying a pressure of 350 MPa for 5 minutes at 10° C. This process produced a product with no detectable contaminating yeast, while retaining a starter culture count of $7.6 \times 10^7$ cfu/g (MRS agar, Table 5).

Example 4

Cultured Dairy Product With no Significant Live Viable Culture [Control Example]

A 10% RSM substrate was inoculated with 1% of a culture of *S. thermophilus* St-1 (FRCCC) and fermented overnight at 37° C. The pH of the cultured skim milk was adjusted to 4.4 by addition of lactic acid, and intentionally contaminated by spiking at $3.5 \times 10^6$ cfu/g (Table 5) with a pink yeast (Table 6). The contaminated cultured milk was then treated by applying a pressure of 400 MPa for 5 minutes at 10° C. This process produced a product with no detectable contaminating yeast (>5-log inactivation). However, the starter culture was reduced from $4.4 \times 10^7$ cfu/g to $6.8\ 10^2$ cfu/g (>4-log inactivation) by the pressure treatment.

Example 5

A Yoghurt Containing a Viable Culture

A yoghurt milk made up with 7.0% skim milk powder (SMP) and 7.5% whole milk powder (WMP), was heated to 55° C. and homogenised at 150/50 bar. The homogenised milk was then heated to 90° C. in a steam-heated waterbath and held at that temperature for 10 minutes. After rapid cooling to 42° C., the milk was inoculated with 1% of a culture of *S. thermophilus* St-10 and *Lb. delbruekii* sub-species *bulgaricus* strain Lb-5033 (FRCCC), then fermented at 42° C. to a pH of 4.4, whereupon it was cooled to 4° C. The resulting yoghurt was intentionally contaminated by spiking at $4.4 \times 10^6$ cfu/g with a *Penicillium* mould and pink yeast. The contaminated yoghurt was then treated by applying a pressure of 450 MPa for about 1 minute at 15° C. This process produced a product with no detectable contaminating yeast or mould (>5-log inactivation), while retaining a starter culture count of $3.0 \times 10^8$ cfu/g (M17 agar, Table 5) and $1.4 \times 10^8$ cfu/g (MRS agar, Table 5).

Example 6

A Fruit Yoghurt Containing a Viable Culture

7% of a sterile fruit puree was added to yoghurt made as in Example 5. It was intentionally contaminated by spiking at $5.4 \times 10^6$ cfu/g with a *Penicillium* mould and pink yeast. The contaminated yoghurt was then treated by applying a pressure of 450 MPa for about 1 minute at 15° C. This process produced a product with no detectable contaminating yeast or mould (>5-log inactivation), while retaining a starter culture count of $6.6 \times 10^8$ cfu/g (M17 agar, Table 5).

Example 7

A Yoghurt Drink Containing a Viable Culture

The yoghurt, produced as in Example 5, was made up to a final formulation of 8% sugar, 1% protein and 0.4% carboxymethylcellulose. The pH of the yoghurt was then adjusted to 4.0 by addition of a citric/lactic acid solution and homogenised at 200 bar. The resulting yoghurt drink was intentionally contaminated by spiking at $7.9 \times 10^6$ cfu/mL with a *Penicillium* mould and pink yeast. The contaminated yoghurt drink was then treated by applying a pressure of 450 MPa for about 1 minute at 15° C. This process produced a product with no detectable contaminating yeast (>5-log inactivation), while retaining a starter culture count of $2.1 \times 10^8$ cfu/mL (M17 agar, Table 5).

Example 8

A Yoghurt Containing a Viable Culture

A yoghurt milk made up with 7.0% SMP and 7.5% WMP, was heated to 55° C. and homogenised at 150/50 bar. The homogenised milks were then heated to 90° C. in a steam-heated waterbath and held at that temperature for 10 minutes. After rapid cooling to 42° C., the yoghurt milk was inoculated with 1% each of *S. thermophilus* St-10 and *Lb. delbruekii* sub species *bulgaricus* strain Lb-1 and fermented at 42° C. to a pH of 4.0, whereupon it was cooled to 4° C. The yoghurt was contaminated by spiking at $3.0 \times 10^6$ cfu/g with a *Penicillium* mould and a pink yeast, and treated by applying a pressure of 450 MPa for about 1 minute at 15° C. This process produced a product with no detectable contaminants (>5-log inactivation), while retaining a starter culture count of $1.8 \times 10^8$ cfu/g (M17 agar, Table 5) and $4.1 \times 10^7$ cfu/g (MRS agar, Table 5).

Example 9

A Yoghurt With no Significant Viable Culture After Treatment at a Low Final pH

A yoghurt milk made up with 7.0% SMP and 7.5% WMP, was heated to 55° C. and homogenised at 150/50 bar. The homogenised milks were then heated to 90° C. in a steam-heated waterbath and held at that temperature for 10 minutes. After rapid cooling to 42° C., the yoghurt milk was inoculated with 1% each of *S. thermophilus* St-10 and *Lb. delbruekii* sub-species *bulgaricus* strain Lb-1 and fermented at 42° C. to a pH of 3.6, whereupon it was cooled to 4° C. The yoghurt was intentionally contaminated by spiking at $3.0 \times 10^6$ cfu/g with a *Penicillium* mould and a pink yeast, and treated by applying a pressure of 450 MPa for about 1 minute at 15° C. This process produced a product with no detectable contaminants (>5-log inactivation). However, the starter culture count was reduced to $1.3 \times 10^4$ cfu/g, from $3.2 \times 10^8$ cfu/g (M17 agar, Table 5).

Example 10

A Yoghurt Containing a Live Probiotic Culture

A yoghurt milks made up with 7.0% SMP and 7.5% WMP, was heated to 55° C. and homogenised at 150/50 bar. The homogenised milks were then heated to 90° C. in a steam-heated water bath and held at that temperature for 10 minutes. After rapid cooling to 42° C., the yoghurt milk was inoculated with 1% *B. lactis* HN019, 0.25% ST10 and 0.25% Lb TH (*Lb. delbruekii* sub-species *bulgaricus* TH, FRCCC). The yoghurt milk was incubated at 38° C. overnight (16 h) to a pH of 4.0. removed from the incubator and cooled to approximately 25° C. It was then smoothed by passing it through a homogeniser at 0 bar and filled into 375 g PET bottles and stored at 5° C. The yoghurts were pressure-treated at 375 MPa for 5 minutes.

An untreated yoghurt sample was retained as a control.

After four weeks storage at 4° C., the yoghurts contained a live probiotic culture (*B. lactis* HN019) of $1.3 \times 10^7$ cfu/g (RBA agar, Table 5), with no contaminating yeasts and moulds.

In contrast, although the untreated control sample contained a live probiotic culture of $2.0 \times 10^7$ cfu/g, it was contaminated with $1.2 \times 10^3$ cfu/g of yeasts and moulds after 4 weeks at 4° C.

Example 11

A Yoghurt Containing a Live Probiotic Culture

A yoghurt formulated as 7.0% SMP, 7.5% WMP, 0.1% pectin and 0.4% starch was prepared as for Example 10. The yoghurt was pressure-treated at 375 MPa for 5 minutes, and untreated yoghurt was retained as a control. After the treated sample was stored at 4° C. for 4 weeks, it contained a live probiotic culture of $5.6 \times 10^7$ cfu/mL (RBA agar, Table 5), with no contaminating yeasts and moulds. In contrast, although the untreated control sample contained a live probiotic culture of $6.2 \times 10^7$ cfu/mL (after 4 weeks at 4° C.) it was contaminated with $3.2 \times 10^2$ cfu/mL of yeasts and moulds.

Example 12

A Direct Acidified Milk Drink Containing a Live Probiotic Culture

A direct acidified milk drink was made by blending Carboxymethylcellulose (CMC) with sugar, and then dispersing it in 1.5 L warm (55° C.) water. WMP was separately dispersed in 1.5 L warm (55° C.) water and then mixed with the CMC-sugar solution. More sugar was added to give a final formulation of 8% sugar, 3.2% WMP and 0.4% CMC. The pH of the milk drink was then adjusted to 4.0 by addition of a citric/lactic acid solution, homogenised at 200 bar, and sterilised at 85° C. in steam bath for 5 minutes. The drink was then chilled and inoculated with $5.7 \times 10^7$ cfu/mL (RCA agar, Table 5) of *Bifidobacterium* (Wisby strain 420). The probiotic drink produced was then treated by applying a pressure treatment of 350 MPa for 5 minutes at room temperature (15° C.). A drink containing live probiotic *Bifidobacterium* at the level of $4.7 \times 10^7$ cfu/mL (RCA agar, Table 5) was so produced.

Example 13

A Direct Acidified Milk Drink Containing no Significant Live Probiotic Culture [Control Example]

The direct-acidified milk drink made as in Example 12 was inoculated with at $4.9 \times 10^7$ cfu/mL (MRS agar, Table 5) of *L. casei* Yakult Shirota strain. The sample was treated at a pressure of 350 MPa for 5 minutes at 15° C. This process produced a product with a count of only 240 cfu/mL (5.3-log reduction) of the *L. casei* probiotic culture after the pressure treatment.

Example 14

An Orange Juice Containing a Live Probiotic Culture

Australian navel oranges were squeezed to produce an orange juice of pH 3.48 and total solids of 10.6%. *B. lactis* stain HN019 was inoculated into the juice at $1.1 \times 10^8$ cfu/mL (RCA agar, Table 5) and the juice was intentionally contaminated by spiking at $2.2 \times 10^7$ cfu/mL with pink yeast. The contaminated probiotic orange juice wad than treated at a pressure of 350 MPa for 5 min at 15° C. This process produced a product with no detectable contaminating pink yeast (>6-log inactivation) while retaining a probiotic culture count of $1.1 \times 10^8$ cfu/mL (RCA agar, Table 5).

Example 15

An Orange Juice Containing a Live Probiotic Culture and Undesirable Organisms The contaminated orange juice made as in Example 14 was treated at a pressure of 300 MPa for 5 minutes at 15° C. Although, the product retained a probiotic culture count of $1.1 \times 10^8$ cfu/mL (RCA agar, Table 5), it was contaminated by $3.8 \times 10^3$ cfu/mL of pink yeast.

Example 16

An Orange Juice Containing a Live Probiotic Culture

The contaminated orange juice made as in Example 14 was treated at a pressure of 600 MPa for 5 minutes at 15° C. This process produced a product with no detectable contaminating Pink yeast (>6-log inactivation) while retaining a probiotic culture count of $4.1 \times 10^6$ cfu/mL (RCA agar, Table 5).

Example 17

Method of Strain Selection

Potential probiotic strains were screened for suitability in the production of a pressure-treated direct-acidified milk drink as follows. A number of commercially available probiotic strains were inoculated into the milk drink and then treated at a pressure suitable for controlling contamination by yeasts and moulds, specifically 350 MPa for 5 minutes. The results of the selection method are shown in Table 1. Neither of the *Lactobacillus* strains evaluated survived the pressure treatment in sufficient numbers. However two of the *Bifidobacterium* strains sold under the trade marks "Bb12" (Nestle) and "Wisby 420" (Wisby), are not appreciably inactivated by the test-pressure treatment.

TABLE 1

Method of selecting a suitable probiotic strain

| | | Count (cfu/mL) | | |
| --- | --- | --- | --- | --- |
| Species | Strains | Before treatment | After treatment | >10$^5$ cfu/mL |
| *L. casei* | shirota - Yakult | $4.90 \times 10^7$ | $2.40 \times 10^1$ | no |
| *L. johnsonii* | Lc-1- Nestle | $7.80 \times 10^7$ | $9.00 \times 10^1$ | no |
| *Bifidobacterium* | 536 - Morinaga | $1.30 \times 10^8$ | $9.00 \times 10^1$ | no |
| *Bifidobacterium* | Bb12 - Nestle | $6.20 \times 10^7$ | $5.20 \times 10^7$ | yes |
| *Bifidobacterium* | 420 - Wisby | $5.70 \times 10^7$ | $3.30 \times 10^7$ | yes |

Example 18

Method of Strain Selection

Potential probiotic strains were screened for suitability in the production of a pressure-treated probiotic orange juice as follows. Two commercially available probiotic strains were inoculated into the juice (pH 4.0) and then treated at a pressure suitable for controlling contamination by spoilage bacteria, specifically 600 MPa for 5 minutes. The results of the selection method are shown in Table 2. Under these conditions both *Bifidobacterium* strains survive the pressure-treatment in sufficient numbers for delivery in a pressure treated orange juice.

TABLE 2

Method of selecting a suitable probiotic strain

| | | Count(cfu/mL) | | |
| --- | --- | --- | --- | --- |
| Species | Strains | Before treatment | After treatment | >10$^5$ cfu/mL |
| *Bifidobacterium* | Bb12 - Nestle | $1.1 \times 10^8$ | $4.1 \times 10^6$ | yes |
| *Bifidobacterium* | 420 - Wisby | $7.0 \times 10^7$ | $1.2 \times 10^6$ | yes |

Example 19

A Low pH Sports Drink with a Live Probiotic Culture

A whey protein isolate sport drink (4.8% whey protein isolate, protein, 0% fat and 10% carbohydrate), with a pH of 3.4, was inoculated with *Bifidobacterium lactis* strain HN019 at $9.2 \times 10^7$ cfu/mL (RCA agar, Table 5) and intentionally contaminated by spiking at $4.5 \times 10^5$ cfu/mL with pink yeast. The contaminated probiotic low pH sport drink was than treated at a pressure of 400 MPa for 5 minutes at 15° C. This process produced a low pH sport drink with no detectable contaminating Pink yeast (>4.6-log inactivation) while retaining a probiotic culture count of $2.7 \times 10^7$ cfu/mL (RCA agar, Table 5).

Example 20

A Nutrition Shake with a Live Probiotic Culture

A Myoplex French vanilla nutrition shake made by EAS, USA, (20 g protein (whey and soy protein isolates, 4.6 g fat and 20 g carbohydrate per 330 mL serving). was inoculated with *Bifidobacterium lactis* strain HN019 at $5.5 \times 10^7$ cfu/mL and intentionally contaminated by spiking at $5.4 \times 10^5$ cfu/mL with Pink yeast. The contaminated probiotic neutral pH sport drink was than treated at a pressure of 500 MPa for 5 minutes at 15° C. This process produced a neutral pH sport drink with no detectable contaminating Pink yeast (>4.7-log inactivation) while retaining a probiotic culture count of $4.8 \times 10^7$ cfu/mL.

Example 21

A Yoghurt Containing a Viable Culture

A yoghurt milk made up with 7.0% SMP and 7.5% WMP, was heated to 55° C. and homogenised at 150/50 bar. The homogenised milk was then heated to 90° C. in a steam-heated water bath and held at that temperature for 10 minutes. After rapid cooling to 42° C., the yoghurt milk was inoculated with 1% of a starter culture sold by Rhodia under the trade mark "MY900", and fermented at 42° C. to a pH of 4.1, whereupon it was cooled to 4° C. The yoghurt was pressure-treated at 400 MPa for 5 minutes (A treatment selected based on the inactivation of contaminating yeasts and moulds, as in earlier Examples). The treated yoghurt had a viable culture of $7.9 \times 10^7$ cfu/g (M17 agar, Table 6).

Example 22

A Yoghurt Containing a Viable Culture

A yoghurt milk, made up with 12.0% whole milk powder (WMP) and 1.7% of whey protein concentrate was heated to 90° C. in a steam-heated water bath and held at that temperature for 10 minutes. After cooling to 42° C., the yoghurt milk was inoculated with a starter culture sold by Rhodia under the trade mark "MY900" (commercial culture), and fermented at 42° C. for 6 hours, to a pH of 4.4, Whereupon it was cooled to 4° C. The contaminated yoghurt was then pressure-treated at 450 MPa for about 5 minutes at 15° C. Based upon previous examples, this treatment is sufficient to inactivate typical dairy yeasts and moulds. This process produced a product with a starter culture count of $3.0 \times 10^7$ cfu/mL (M17 agar, Table 5).

Example 23

A Yoghurt with a Viable Culture

Figure 2:
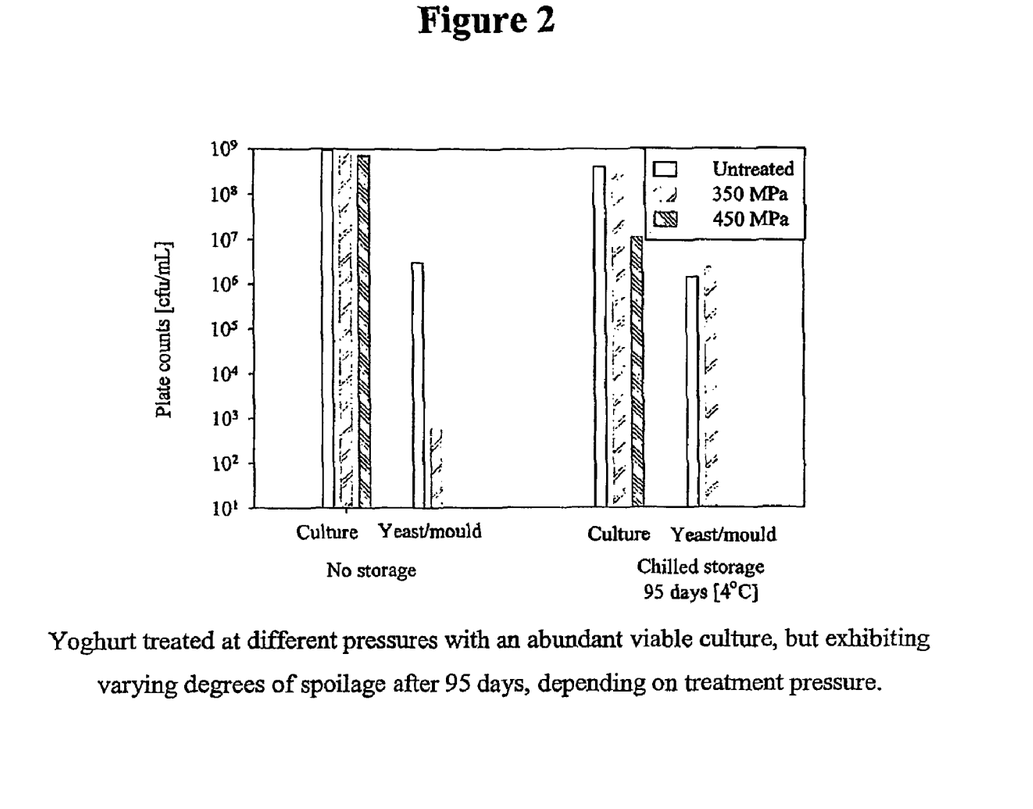
FIG. 2 shows the effect of varying pressure treatments on levels of viable culture and spoilage organisms after 95 days of storage at 4 degrees Celsius.

A yoghurt milk made up of 7.0% slum milk powder and 7.5% whole milk powder was heated to 55° C. and homogenised at 150/50 bar. The homogenised milk was then heated to 90° C., held for 10 mins and rapidly cooled to 42° C. The milk was then inoculated with a Rhodia MY900 culture, fermented at 42° C. to a pH of 4.5 and cooled to 4° C. Two samples of the resulting yoghurt were pressure treated at 350 MPa and 450 MPa for 1 minute and refrigerated. After 95 days of storage at 4° C., the live culture and contaminating mould counts were compared with an untreated control sample. The results are shown in FIG. 2. The untreated and 350 MPa-treated samples were contaminated by more than one million colony-forming units of mould per gram, but the 450 MPa-treated sample had no detectable mould. In all three cases, the live culture count exceeded ten million colony-forming units per gram at 95 days.

Example 24

A Pressure Yoghurt Containing a Viable Culture

Figure 3:
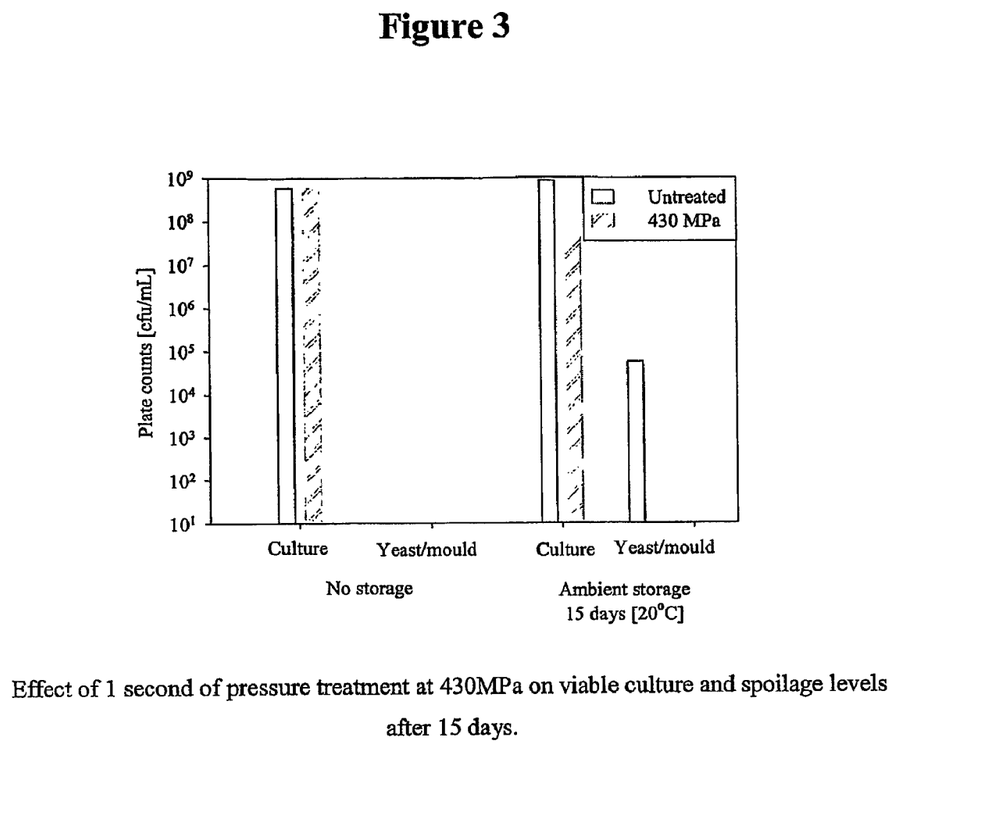
FIG. 3 shows the effect of varying pressure treatments on levels of viable culture and spoilage organisms after 15 days of storage at 20 degrees Celsius.

A yoghurt was made as in Example 24, and pressure treated to 430 MPa for about one second. After 15 days storage at 20° C., the level of live culture and contaminating moulds were compared with an untreated control sample. The results shown in FIG. 3 show that after storage, the untreated control was contaminated by >$10^4$ cfu/mL of mould, but the pressure-treated yoghurt has no detectable mould. In both cases, the live culture exceeded $10^7$ cfu/mL at 15 days.

Example 25

A Pressure Treated Yoghurt Containing a Viable Culture

A yoghurt was made as in Example 24, intentionally spiked with >$10^5$ cfu/g of a *penicillium* mould, and pressure treated to the pressures 360 MPa, 400 MPa, 430 MPa, 460 MPa, 480 MPa and 500 MPa for about one second. The counts of live culture, moulds, and the mould log-reduction are given in Table 3, with an untreated control yoghurt for comparison. All pressure treatments produced yoghurts with >$9 \times 10^8$ cfu/g of live culture. The 360 MPa and 400 MPa pressure treatments did not significantly reduce the level of mould contamination. The 430 MPa treatment produced a 2.4-log cycle reduction in mould counts, whereas the 460 MPa, 480 MPa and 500 MPa treatments produced yoghurts with no detectable moulds (>4.8 log-cycle reduction).

TABLE 3

| Pressure treatment | Culture count (cfu/g) | Mould count (cfu/mL) | Mould reduction (cfu/mL) |
| --- | --- | --- | --- |
| None- control | $1.2 \times 10^9$ | $7.3 \times 10^5$ | 0 |
| 360 MPa | $1.1 \times 10^9$ | >$1.5 \times 10^6$ | (+0.3) |
| 400 MPa | $1.0 \times 10^9$ | $2.5 \times 10^5$ | 0.1 |
| 430 MPa | $6.1 \times 10^8$ | $3.3 \times 10^3$ | 2.4 |
| 460 MPa | $1.0 \times 10^9$ | none detected (<10) | >4.8 |
| 480 MPa | $1.1 \times 10^9$ | none detected (<10) | >4.8 |
| 500 MPa | $1.0 \times 10^9$ | none detected (<10) | >4.8 |

Example 26

A Cultured Beverage Containing a Live Probiotic Culture

10% reconstituted skim milk in water was fermented with *Bifidobacterium lactis,* and mixed into a sucrose, carboxymethylcellulose mixture, pH-adjusted to 4.0 with phosphoric acid and homogenised at 200 bar, to produce a probiotic-containing beverage of 3% milk solids, 8% sugar and 0.4% carboxymethycellulose. The beverage was pressure treated at 600 MPa for 1 second and the level of microbial contamination compared to an untreated control beverage. The pressure-treated and control-untreated beverages both contained live culture >$10^8$ cfu/g, but the untreated beverage also had an aerobic plate count of 30 cfu/g and a yeast/mould count of 20 cfu/g The pressure-treated beverage had no contaminants detected by those two methods.

Example 27

Yoghurts Made to Three Different pH Values

Three yoghurts were made by fermenting 7.0% skim milk powder and 7.5% whole milk powder reconstituted in water with a culture of *Streptococcus thermophilus* (St10) and *Lactobacillus bulgaricus* (Lb1) to three different final pH values, 4.3, 4.1 and 3.9.

Figure 4:
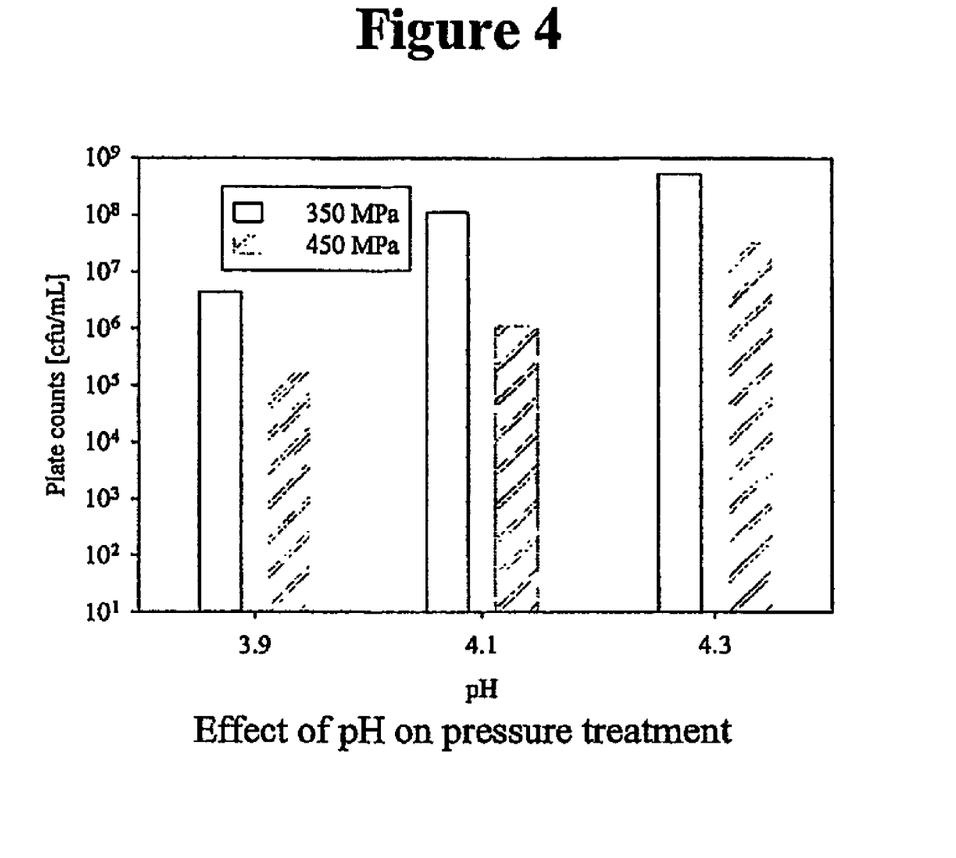
FIG. 4 shows the effect of pressure treatments performed at different pH levels.

The three yoghurts were then pressure-treated at 350 MPa and 450 MPa for 5 minutes, and the surviving culture enumerated on M17 agar in each case, and shown in FIG. 4.

The yoghurt at the higher pH (pH=4.3) had live culture counts >$10^7$ cfu/mL after both treatments.

The yoghurt at the intermediate pH (pH=4.1) had a live culture count >$10^7$ cfu/mL after the 350 MPa treatment, but not after the 450 MPa treatment The yoghurt at the lower pH (pH=3.9) had a live culture count <$10^7$ cfu/mL after both treatments.

Example 28

A Yoghurt Pressure Treated for Three Different Treatment Times

10% reconstituted skim milk powder was inoculated with Lb-5033 and St-10 and fermented to a pH of 4.4 at 37° C. The resulting cultured milk was then challenged with a mixture of pink yeast and *penicillium* mould and pressure-treated at 350 MPa for either 5, 10 or 15 mins. The cultured milk treated for 5 mins had a live culture count of 2.8×$10^7$ cfu/g (on M17 agar), and a 4.1 log-cycle reduction of contaminating yeasts and moulds, The cultured milk treated for 10 mins had a live culture count of only 5.7×$10^5$ cfu/g (M17 agar) with no detectable contaminating yeasts and moulds. The cultured milk treated for 15 mins had a live culture count of only 1.9×$10^5$ cfu/g (M17 agar) with no detectable contaminating yeasts and moulds.

Example 29

Pressure Treatment of Commercial Yoghurt Cultures

Yoghurt milk was prepared by reconstituting SMP at 10% solids. The milk was heated to 55° C. and homogenised at 150/50 bar, and then heated to 90° C. for 10 mins and cooled. The milk was then divided up into equal aliquots and each separately inoculated with a commercial starter from the list in Table 4. The milks were incubated for 16 hours at 40° C. or 38° C. After incubation, the yoghurts were cooled in an ice-bath and the pH measured, and adjusted to 4.4 as necessary. The yoghurts were each treated at a pressure of 400 MPa for 5 mins, and had a culture count of >$10^7$ cfu/g (on M17 agar).

TABLE 4

| Culture | Supplier | 400 MPa - 5 min (count cfu/mL) |
| --- | --- | --- |
| St-B-01 | Chr. Hansen | 2.0 × $10^3$ |
| YC-X11 | Chr. Hansen | 1.8 × $10^8$ |
| YC-180 | Chr. Hansen | 2.5 × $10^5$ |
| YC-380 | Chr. Hansen | 4.3 × $10^4$ |
| ABT 3 | Chr. Hansen | 6.0 × $10^7$ |
| ABT 4 | Chr. Hansen | 2.0 × $10^7$ |
| V1 | Danisco | 1.0 × $10^7$ |
| Yo Mix VW | Danisco | 2.0 × $10^8$ |
| MSK Mix AB N 1-45 | Danisco | 2.3 × $10^8$ |
| BF420 | Danisco | 3.6 × $10^5$* |
| MY 105 | Rhodia | 2.7 × $10^7$ |
| MYE 95 | Rhodia | 5.5 × $10^7$ |
| MY Bio 6 | Rhodia | 8.0 × $10^7$ |
| TA 060 | Rhodia | 1.3 × $10^8$ |
| LH 100 | Rhodia | 6.4 × $10^7$* |
| MY 900 | Rhodia | 2.2 × $10^8$ |

*enumerated on MRS agar

Enumeration of Culture

An appropriate amount of sample was added to diluent to produce a $10^{-1}$ dilution. Then, subsequent dilutions were prepared serially to plate out a range from $10^{-1}$ to $10^{-7}$ for each sample. The dilutions were then plated onto appropriate agars for each species (Table 5). The agars were selected for efficient recovery of the test species, and prepared according to the manufacturer's instructions. The species and corresponding method used are summarised in Table 5.

TABLE 5

A Summary of the Methods used for Microbiological Enumeration

| Culture | Agar used | Supplier | Summary of conditions |
| --- | --- | --- | --- |
| S. thermophilus | M17 | Difco (Cockeysville, USA) | 37° C., 48 h, aerobic |
| Lb. delbruekii subsp bulgaricus L. helveticus | MRS | Difco | 37° C., 48 h, Anaerobic |
| Yeasts and moulds | YGCA | Merck Darmstadt, Germany | 25° C., 5 days |
| Bifidobacterium | RCA | Merck | 37° C., 3 days, Anaerobic |
| L. rhamnosus L. johnsonii L. para-casei L. casei | MRS | Difco | 37° C., 3 days, Anaerobic |
| *Bifidobacterium differential | RBA | Made at Fonterra Research Centre | 37° C., 3 days Anaerobic |

RBA agar reference: Raffinose-*Bifidobacterium* (RB) agar, a new selective medium for *Bifidobacteria*', R. Hartemink et al, Journal of Microbial Methods 27 (1996) 33-43

TABLE 6

A summary of the yeast and mould contaminants used in the examples

| Strain | Origin | Source | Description |
| --- | --- | --- | --- |
| Yarrowia lipolytica | Yeast isolate from dairy product | FRC* Starter Group culture collection | Contaminant from a dairy product |
| Unknown | 'Pink yeast' Isolated from a dairy product | FRC Starter Group culture collection | Contaminant from dairy product |
| Candida famata | Yeast isolate from dairy product | FRC Starter Group culture collection | Contaminant from a dairy product |
| Candida parapsilosis | Yeast isolate from dairy product | FRC Starter Group culture collection | Contaminant from a dairy product |
| Debramyces Hanseii | Yeast isolate from dairy product | FRC Starter Group culture collection | Contaminant from a dairy product |
| Geotrichum candidum | Mould isolate from dairy product | FRC Starter Group culture collection | Contaminant from a dairy product |
| Cladosporium | Mould isolate from dairy product | FRC Starter Group culture collection | Contaminant from a dairy product |
| Penicillium | Mould isolate from dairy product | FRC Starter Group culture collection | Contaminant from a dairy product |

*Fonterra Research Centre, Palmerston North, New Zealand.

The above describes some preferred embodiments of the present invention and indicates several possible modifications but it will be appreciated by those skilled in the art that other modifications can be made without departing from the scope of the invention.

REFERENCES

1. E. Caplice and G. F. Fitzgerald, *International Journal of Food Microbiology*. 50 (1999) 131.
2. W. H. Holzapfel, R. Geisen, Schillinger, *International Journal of Food Microbiology*. 24 (1995) 343.
3. Y.-K Lee and S. Salaminen, *Trends in Food Science and Technology*, 6 (1995) 241.
4. K Buchanan and M. Patterson, *The Chemical Engineer*, January 2002, 20.

What we claim is:

1. A method of treating a food comprising the following steps:
    selecting a food comprising at least one strain of a culture, said strain capable of surviving a pressure treatment at a predetermined pressure and pH, wherein the food is a cultured dairy product, yoghurt, or is selected from the group consisting of a yoghurt drink, a dairy dessert, cottage cheese, cream cheese and cultured beverages and
    subjecting the food to a treatment pressure at or below the predetermined pressure, wherein the treatment pressure reduces, delays, prevents or eliminates growth of spoilage microflora;
    wherein the treatment pressure is at least 350 MPa and wherein the food is subjected to the treatment pressure for about 5 minutes or less.
2. A method according to claim 1 wherein the treatment pressure is at least 400 MPa.
3. A method according to claim 2 wherein the treatment pressure is at least 500 MPa.
4. A method according to claim 1 wherein the food is at a pH of between 3.0 and 8.0 when subjected to the treatment pressure.
5. A method according to claim 4 wherein the pH is between 3.6 and 4.8.
6. A method according to claim 5 wherein the pH is between 4.0 and 4.6.
7. A method according to claim 1 wherein said strain is a strain of a protective culture, said strain capable of surviving a pressure treatment at a predetermined pressure and pH.
8. A method according to claim 1 wherein the food is subjected to the treatment pressure for about 1 minute.
9. A method according to claim 1 wherein the food is subjected to the treatment pressure for less than 1 minute.
10. A method according to claim 1 wherein the food is subjected to the treatment pressure for less than 30 seconds.
11. A method according to claim 1 wherein the food is subjected to the treatment pressure for less than 5 seconds.
12. A method according to claim 1 wherein the food is subjected to the treatment pressure for about 1 second.
13. A method according to claim 1 wherein the food is subjected to the treatment pressure at a temperature between about 0 degrees Celsius and 40 degrees Celsius.
14. A method according to claim 13 wherein the food is subjected to the treatment pressure at a temperature between about 0 degrees Celsius and 20 degrees Celsius.
15. A method according to claim 1 wherein the food has been packaged prior to being subjected to the treatment pressure.
16. The method of claim 1, wherein the selected strain does not cause spoilage of the food.
17. The method of claim 1, wherein the selected strain has a viable culture count of at least one hundred thousand colony-forming units per gram after the pressure treatment.
18. A method of treating a food comprising the following steps:
    selecting a food comprising at least one strain of a culture, said strain capable of surviving a pressure treatment at a predetermined pressure and pH, wherein the strain of culture is selected from the group consisting of:
        i) *Lactobacillus acidophilus*
        ii) *Bifidobacterium lactis*
        iii) *Streptococcus thermophilus*
        iv) *Lactobacillus helveticus*
        v) *Lactobacillus delbrukeii subsp bulgaricus*;
    and any combination thereof; and
    subjecting the food to a treatment pressure at or below the predetermined pressure, wherein the treatment pressure reduces, delays, prevents or eliminates growth of spoilage microflora;
    wherein the treatment pressure is at least 350 MPa and wherein the food is subjected to the treatment pressure for about 5 minutes or less.
19. A method according to claim 18 wherein the treatment pressure is at least 400 MPa.
20. A method according to claim 19 wherein the treatment pressure is at least 500 MPa.
21. A method according to claim 18 wherein the food is at a pH of between 3.0 and 8.0 when subjected to the treatment pressure.
22. A method according to claim 21 wherein the pH is between 3.0 and 4.6.
23. A method according to claim 21 wherein the pH is between 3.6 and 4.8.
24. A method according to claim 21 wherein the pH is between 4.0 and 4.6.
25. A method of treating a food comprising the following steps:
    selecting a food comprising at least one strain of a culture, said strain capable of surviving a pressure treatment at a predetermined pressure and pH, wherein the food is selected from a yoghurt, a cultured dairy product, a beverage, a fruit juice and a vegetable juice, and wherein said strain is a probiotic strain capable of surviving a pressure treatment at a predetermined pressure and pH, and
    subjecting the food to a treatment pressure at or below the predetermined pressure, wherein the treatment pressure reduces, delays, prevents or eliminates growth of spoilage microflora;
    wherein the treatment pressure is at least 350 MPa and wherein the food is subjected to the treatment pressure for about 5 minutes or less.
26. A method according to claim 25 wherein the probiotic strain is *Bifidobacterium*.
27. A method according to claim 26 wherein the probiotic strain is *Bifidobacterium lactis*.
28. A method according to claim 27 wherein the probiotic strain is *Bifidobacterium lactis* HN019 AGAL deposit number NM97/09513 dated 18 Aug. 1997.
29. A method according to claim 25 wherein the probiotic strain is *Lactobacillus*.
30. A method according to claim 29 wherein the probiotic strain is *Lactobacillus acidophilus*.
31. A method according to claim 30 wherein the probiotic strain is *Lactobacillus acidophilus* HN017 AGAL deposit number NM97/09515 dated 18 Aug. 1997.

32. A method according to claim 25 wherein the treatment pressure is at least 400 MPa.

33. A method according to claim 32 wherein the treatment pressure is at least 500 MPa.

34. A method according to claim 25 wherein the food is at a pH of between 3.0 and 4.6 when subjected to the treatment pressure.

35. A method according to claim 25 wherein the food is at a pH of between 3.0 and 8.0 when subjected to the treatment pressure.

36. A method according to claim 35 wherein the pH is between 4.0 and 4.6.

37. A method of treating a food comprising the following steps:

selecting a food comprising a bacterial strain selected from the group consisting of *Lactobacillus acidophilus* HN017 AGAL deposit number NM97/09515 dated 18 Aug. 1997 and *Bifidobacterium lactis* HN019 AGAL deposit number NM97/09513 dated 18 Aug. 1997; and subjecting the food to a treatment pressure of between 350 MPa and 600 MPa, at a pH of between about 3.0 and about 8.0.

\* \* \* \* \*

UNITED STATES PATENT AND TRADEMARK OFFICE
CERTIFICATE OF CORRECTION

PATENT NO. : 7,854,950 B2
APPLICATION NO. : 10/530536
DATED : December 21, 2010
INVENTOR(S) : Tim Carroll et al.

Page 1 of 1

It is certified that error appears in the above-identified patent and that said Letters Patent is hereby corrected as shown below:

In Column 2, Line 41, change "bulgahcus" to --bulgaricus--

In Column 2, Line 46, change "ABNA45," to --ABN1-45,--

In Column 3, Line 15, change "50 MPa," to --500 MPa,--

In Column 3, Line 51, change "stain" to --strain--

In Column 3, Line 61, change "YC-X1 1," to --YC-X11,--

In Column 3, Line 62, change "ABN145," to --ABN-45,--

In Column 4, Line 10, after "included" insert --.--

In Column 4, Line 32, change "PEP)" to --(HHP)--

In Column 4, Line 53, after "treatment" insert --.--

In Column 7, Line 32, change "AU" to --All--

In Column 8, Line 18, change "bulgaficus" to --bulgaricus--

In Column 9, Line 44-45, change "sub species" to --sub-species--

In Column 11, Line 21, change "stain" to --strain--

In Column 11, Line 24, change "wad" to --was--

In Column 13, Line 45, change "slum" to --skim--

In Column 18, Line 14, in Claim 18, change "v)Lactobacillus" to --v) Lactobacillus--

In Column 18, Line 35, in Claim 24, change "claim 21" to --claim 23--

Signed and Sealed this
Fifteenth Day of November, 2011

David J. Kappos
*Director of the United States Patent and Trademark Office*